UNITED STATES PATENT OFFICE.

HARRY H. PIERCE, OF INDIANAPOLIS, INDIANA, ASSIGNOR OF ONE-TENTH TO JOHN KEAY, OF INDIANAPOLIS, INDIANA.

PLASTIC COMPOSITION.

1,245,021.      Specification of Letters Patent.      Patented Oct. 30, 1917.

No Drawing.      Application filed January 30, 1917. Serial No. 145,503.

*To all whom it may concern:*

Be it known that I, HARRY H. PIERCE, a citizen of the United States, residing at Indianapolis, in the county of Marion and State of Indiana, have invented new and useful Improvements in Plastic Compositions, of which the following is a specification.

This invention relates to wall plaster, or the like and its object is to provide plastic compositions for use in the manufacture of tiles, etc., or as a composition of this character which is extremely light in weight, which is elastic and will not crack or break under all ordinary conditions of service, which is a perfect non-conductor of sound, which may be washed and scrubbed without injury and which is hard and tough and capable of being cut and sawed, or penetrated by nails, without liability of cracking or disintegrating.

A further object of the invention is to provide a composition adapted for use as a wall plaster which may be easily and conveniently spread and applied which will firmly adhere to the laths and wall or other surface, and which embodies the other desirable advantages above set forth.

In carrying my invention into practice, for the production of a wall, I employ a filler consisting of coke breeze or coke dust, combined with a suitable cementitious binder and other materials if desired. Coke dust, or, as it is sometimes called, coke breeze, I have found to be superior in every respect to sand and other fillers, as it is much lighter in weight, while at the same time combines more thoroughly with the binding substances used, and produces a plastic material which is tougher and harder, and much more elastic, than plastic materials employing sand or equivalent material as a base or filler.

In practice, I may employ plaster of Paris, lime, Portland or other cement or stucco as a binding substance, according to the special service for which the plaster is to be made. In making a mortar for plastering wood, metal or any other surface except tile, brick or like material, I preferably employ the following composition, subject to such changes in proportions as is especially suitable for the particular surface to be plastered.

Coke dust, ground very fine, 50 parts;
Hydrated lime, 25 parts;
Ground clay, 8½ parts; and
Stucco, 38 parts, combined with a small quantity of cattle hair to hold the particles combined when pushed through cracks or crevices, and a small quantity of a suitable retarder to govern the time period of the setting of the mass.

In cases where the material is to be used on brick, tile or like wall surfaces, the hair is omitted and in lieu thereof about 5 parts, more or less, of coke dust is added.

In preparing the composition, the materials are intermittently mixed in a dry condition, stored in bags or other receptacles for delivery when wanted, and when it is desired to employ the composition a suitable quantity thereof is combined with water and reduced to a plastic condition suitable to be applied to the surface by means of a plastering trowel. The plaster when applied to the usual thickness on a wall surface weighs approximately 60 lbs. to the cubic foot, while other plasters employing sand as a filler weigh in the neighborhood of 100 lbs. to a cubic foot, a material saving of weight being thereby effected. When the plaster is dry it is a perfect non-conductor of sound capable of being washed and scrubbed without injury, and is at the same time elastic and may vibrate and bend to the structure element to which it is applied without breaking or cracking. It may be sawed or cut in a cleanly manner at any time and is tough enough to enable nails to be driven through it without cracking, splitting or disintegrating.

The binding material employed, for instance lime, is invariably used in a hydrated condition, thus avoiding any change in the proportions of the elements when combined and mixed with water for use, as well as avoiding the generation of heat, whereby the composition is weakened and its binder powers materially impaired. A filler consisting of coke dust may accordingly be efficiently and economically used in the production of a plaster which is superior in every respect to plasters of the kind employing sand and like fillers, or which employ a binding, such as lime, in an unslaked state.

In preparing a plastic composition for use in the production of tiles, such as hollow partition tiles, and other objects, the hair retarder, hydrated lime and ground clay are omitted, the coke dust being combined with a stucco of plaster or cement. The coke dust in this composition gives the necessary grit to produce a hard firm tile or other article, and which is exceedingly strong and durable and light in weight. Nails may be driven through such a tile without cracking or breaking the same, and, as the coke dust has a tendency to grip the nail and hold it firmly, the necessity of inserting wooden blocks in the plaster wall within which to drive the nails is avoided. In case of a fire, a bond of this character will hold and maintain the tiles in position, whereas under like conditions wooden supporting blocks are liable to be burned out, thus breaking the bond and allowing the wall to fall. Where sand is used as a filler, the composition is liable to crumble, break or crack under strain, while on the contrary the coke breeze holds the particles firmly and intermittently combined and resists fracture and disintegration to a high degree.

I claim:—

A plastic composition including dry slaked lime, coke dust, ground clay and a stucco.

In testimony whereof I affix my signature in presence of two witnesses.

HARRY H. PIERCE.

Witnesses:
W. D. LANE,
JNO. KEAY.